US008505486B2

(12) United States Patent
Trussardi

(10) Patent No.: US 8,505,486 B2
(45) Date of Patent: Aug. 13, 2013

(54) PET LITTER BOX

(76) Inventor: Roger Trussardi, Ticino (CH)

( * ) Notice: Subject to any disclaimer, the term of this patent is extended or adjusted under 35 U.S.C. 154(b) by 106 days.

(21) Appl. No.: 13/001,707

(22) PCT Filed: Jun. 18, 2009

(86) PCT No.: PCT/EP2009/057565
§ 371 (c)(1),
(2), (4) Date: Dec. 28, 2010

(87) PCT Pub. No.: WO2010/003794
PCT Pub. Date: Jan. 14, 2010

(65) Prior Publication Data
US 2011/0100301 A1    May 5, 2011

(30) Foreign Application Priority Data
Jul. 7, 2008    (WO) .................. PCT/IB2008/001772

(51) Int. Cl.
*A01K 1/01*    (2006.01)
(52) U.S. Cl.
USPC .......................................................... 119/169
(58) Field of Classification Search
USPC ................. 119/161, 162, 163, 164, 165, 166, 119/167, 168, 169, 170
IPC ....................................................... A01K 1/01
See application file for complete search history.

(56) References Cited

U.S. PATENT DOCUMENTS

| 4,640,225 | A | 2/1987 | Yananton |
| 4,949,673 | A | 8/1990 | Yamamoto |
| 4,972,800 | A | 11/1990 | Bennett et al. |
| 6,645,597 | B1 * | 11/2003 | Swain .............................. 428/68 |
| 2001/0025910 | A1 * | 10/2001 | Olivadoti ................. 248/346.01 |
| 2003/0031824 | A1 | 2/2003 | Olivadoti |
| 2003/0094140 | A1 * | 5/2003 | Otsuji et al. ................... 119/169 |
| 2006/0042551 | A1 * | 3/2006 | Moran ........................... 119/166 |
| 2007/0169707 | A1 * | 7/2007 | van Zuilekom ............... 119/169 |
| 2008/0251026 | A1 * | 10/2008 | Bell et al. ....................... 119/168 |
| 2009/0178622 | A1 * | 7/2009 | Havluciyan .................... 119/161 |
| 2009/0199778 | A1 * | 8/2009 | Kratzer et al. ................. 119/165 |

FOREIGN PATENT DOCUMENTS

| EP | 0 698 341 | 2/1996 |
| JP | 2005-080648 | 3/2005 |

OTHER PUBLICATIONS

International Search Report for PCT/EP2009/057565, mailed Sep. 10, 2009.
Written Opinion of the International Searching Authority for PCT/EP2009/057565, mailed Sep. 10, 2009.

* cited by examiner

*Primary Examiner* — Monica Williams
*Assistant Examiner* — Joshua Huson
(74) *Attorney, Agent, or Firm* — Nixon & Vanderhye, PC

(57) ABSTRACT

A pet litter box (1) comprises a base element (10) having a support surface (11) for a pet, an absorbent mat (20) laid on the base element (10), and an open-top frame (30) removably mounted to the base element (10). The frame (30) has a bottom wall (31) associated with the base element (10) with the absorbent mat (20) thereon. The bottom wall (31) has an opening (32) in such position as to entirely overlap at least one portion (21) of the absorbent mat (20), and at least one side wall (35) that extends vertically from the bottom wall (31) to define an entrance (33) for a pet into such portion (21) of the absorbent mat (20).

22 Claims, 5 Drawing Sheets

PET LITTER BOX

This application is the U.S. national phase of International Application No. PCT/EP2009/057565, filed 18 Jun. 2009, which designated the U.S. and claims priority to International Application No, PCT/IB2008/001772, filed 7 Jul. 2008, the entire contents of each of which are hereby incorporated by reference.

The present invention relates to a pet litter box.

Pet litter boxes are known in the art and are used to allow small pets, such as cats, dogs and the like, to accomplish their physiological functions. The pet owner is still required to keep the litter box clean and remove the feces or urine excreted by the pet.

Pet litter boxes typically comprise a plastic container in which granular urine absorbing material is placed. Once the pet has accomplished its functions, the owner removes the granular material with the feces from the litter box and replaces it with clean material.

Pet litter boxes have been recently developed which use absorbent mats in addition to or instead of the granular material.

A pet litter box that uses a granular material and an absorbent mat is disclosed in patent application US 2006/288948. Such litter box has a base with a container for granules allowing liquid drainage and a removable tray placed below the container with an absorbent sheet laid thereon. The litter box further includes a rigid curved structure that is designed to be removably associated with the base and extends along three sides of the base. This litter box has a rather complex construction and requires the use of granular material only.

A pet litter box that uses an absorbent mat only is disclosed in patent application US 2007/0169707. In accordance with this prior art document, the litter box includes a planar base having an absorbent mat and two vertical panels extending from the perimeter of the base, also equipped with an absorbent mat. Nonetheless, this litter box cannot be reused countless times and shall be wholly replaced after one or two uses by the pet.

U.S. Pat. No. 4,640,225 disclose a pet litter box comprising an outer shell unit slipped over an inner shell unit so as to lock an absorbent unit in place. A granular material is placed on top of the absorbent mat to provide the pet with the necessary scratching materials. The absorbent unit comprises an outer layer, a sorbent layer, a protective layer and a protective screen of flexible, durable substance placed upon the protective layer for preventing the pet from scratching through the bottom layers. First of all, it should be noted that, in some cases, such as with elderly, small size or handicapped pets, the pet is prevented to access the litter box since the only access way is from the top of the litter box. In these cases, the owner of the pet necessitates to raise the pet and put it in place into the litter box. Moreover, cleaning of the litter box is made difficult due to the presence of the protective layer and protective screen that must be removed every time one needs to replace the used absorbent layer with a new one, once the pet has accomplished its physiological functions. In addition, the flat inner bottom region of the outer shell let urine and feces to stagnate thereon and the sharp corner of the areas connecting this bottom region with the vertical walls of the outer shell makes more difficult cleaning operations of the litter box.

U.S. Pat. No. 4,972,800 discloses litter box comprising a tray and an upstanding rectangular wall structure positioned in overlying superimposed relation to the tray when in use. Under the bottom panel of the tray a newspaper or any other absorbent material may be placed to absorb urine flowing from the tray. Extending transversely between the bottom edges of two lateral walls of the structure are support rails rigidly affixed to the walls. Secured to the upper surface of the support rails is a screen member forming the bottom of the wall structure. Also in this litter box, cleaning and removing of urine and feces is difficult. In fact, the screen member retains feces so that their removal becomes extremely difficult as well as it partially retains also the urine so that the urine can not flow towards the absorbent material disposed beneath it. Moreover, the sharp corners of the wall structure makes more difficult the cleaning and removal of any residual of feces and/or urine of the pet.

Thus, there arises the need of providing a pet litter box that has a simple construction and allows easy and fast cleaning by the pet owner.

Therefore, the object of the present invention is to provide a pet litter box that has such features as to fulfill the above need, while obviating the drawbacks of prior art.

This object is fulfilled by a pet litter box as defined in claim 1.

Further features and advantages of the pet litter box of the present invention will be apparent from the following description of one preferred embodiment thereof, which is given by way of illustration and without limitation with reference to the accompanying figures, in which.

Figure 1:
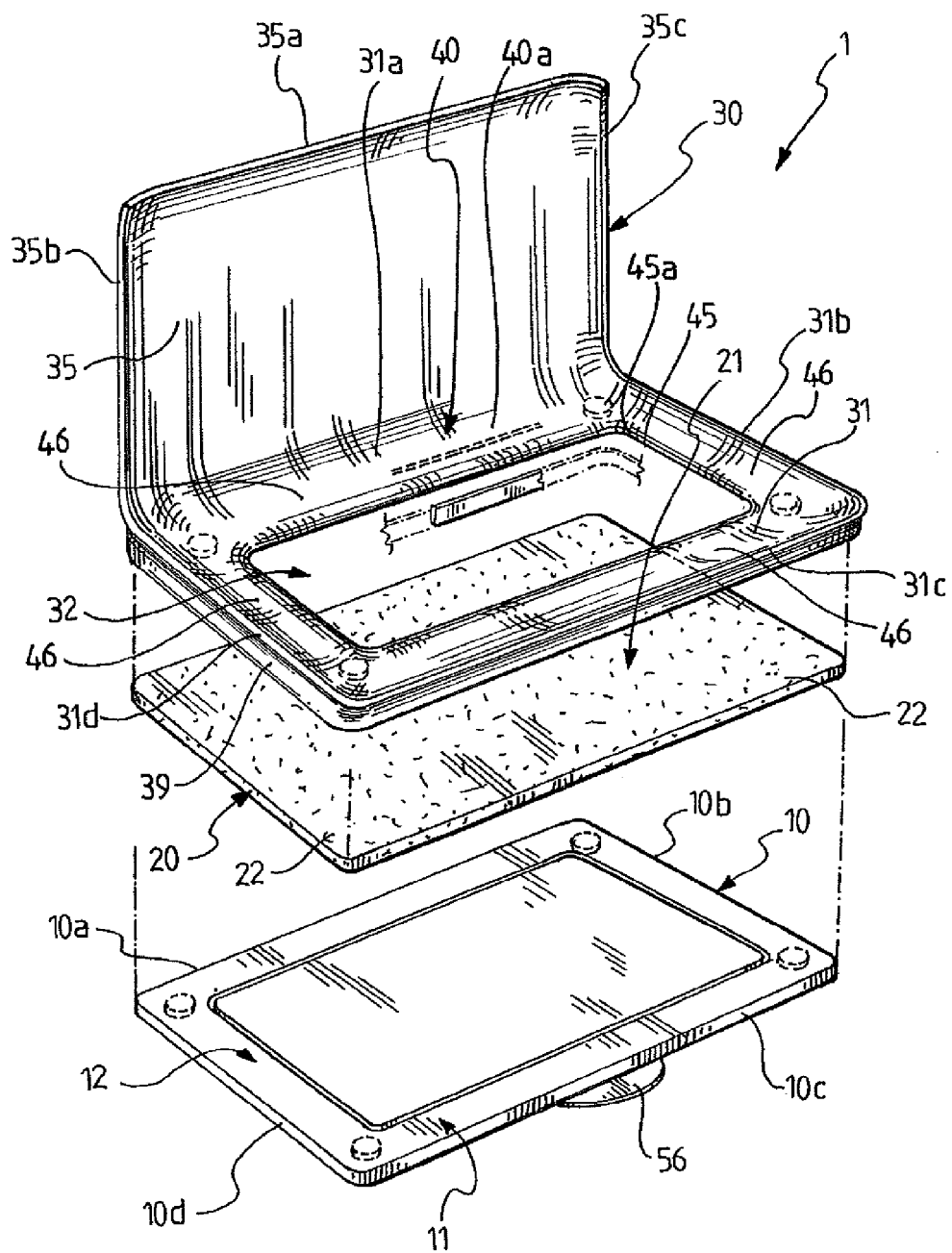
FIG. 1 is a perspective view of a first embodiment of a pet litter box of the present invention.
Figure 2:
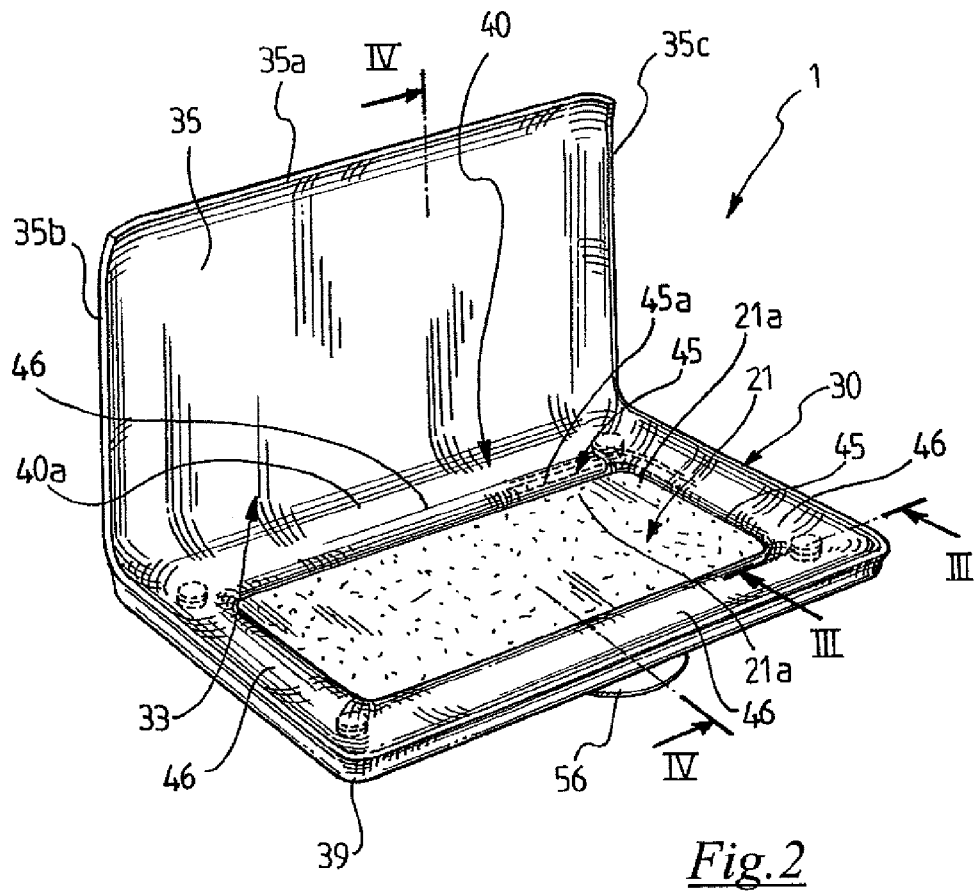
FIG. 2 is a perspective view of the litter box of FIG. 1 in operation.
Figure 3:
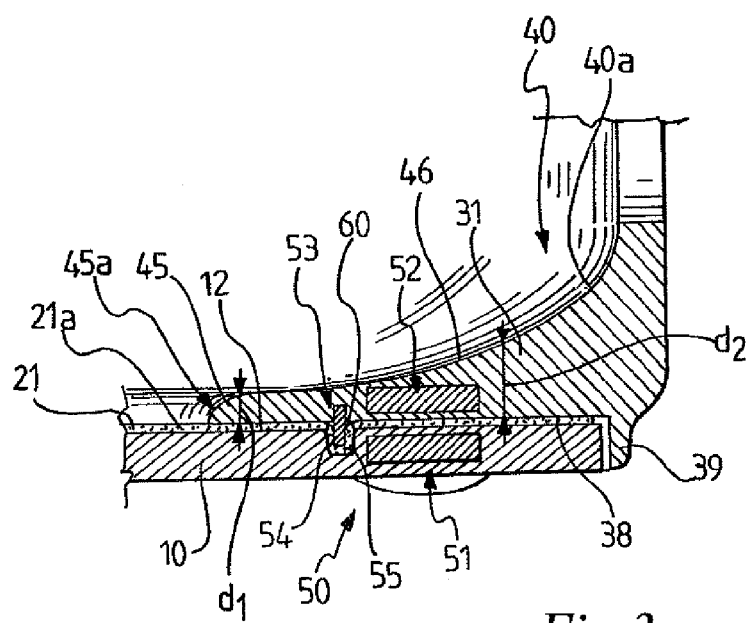
FIG. 3 is a sectional view of a detail of the litter box of FIG. 2, as taken along line III-III.

Referring to the annexed figures, numeral 1 generally designates a pet litter box as defined in the present invention.

The litter box 1 comprises a base element 10 having a support surface 11 for a pet, an absorbent mat 20 laid on the base element 10, and an open-top frame 30 removably mounted to the base element 10.

Particularly, the frame 30 has a bottom wall 31 and at least one side wall, represented in FIG. 1 as the side wall 35. The side wall 35 protects the area that is designed to receive the frame 30 from any pet's urine or feces sprinkling.

The bottom wall 31 of the frame 30 is associated with the base element 10 having the absorbent mat 20 thereon and has an opening 32 placed in such position as to entirely overlap at least one portion of the absorbent mat 20, so that such portion of the absorbent mat 20 is directly exposed from within the opening 32 of the bottom wall 31.

In the embodiment illustrated in the annexed figures, the opening 32 overlaps one portion 21 of the absorbent mat 20, whereas one portion 22 of the absorbent mat 31 is not exposed from within the opening but is covered by the bottom wall 31. In this case, due to the weight force exerted by the frame 30 on the base element 10, the portion 22 of the absorbent mat 20 is trapped between the underside 38 of the bottom wall 31 and the topside 12 of the base element 10. By this arrangement, the absorbent mat 20 is held in position even when, for example, the pet lies on the mat and rubs its paws against it.

The portion 21 of the absorbent 20, directly exposed from within the opening 32, is so directly accessible by the pet.

According to one embodiment, the opening 32 is delimited by a peripheral edge 45 joining the bottom wall 31 with the peripheral edge 21a of the portion 21 of the absorbent mat 20, directly exposed from within the opening 32.

According to one embodiment, the peripheral edge 45 is shaped so as to define a countersunk or tapered opening 32, countersinking or tapering from the bottom wall 31 towards the peripheral edge 21a of the portion 21 of the absorbent mat 20 so as to convey the urine from the bottom wall 31 towards the absorbent mat 20.

In particular, the thickness $d_1$ of the peripheral edge 45, moving from the bottom wall 31 towards the absorbent mat 20, continuously and gradually decreases from the bottom wall 31 towards the absorbent mat 20.

By this way, a continuously and gradually decreasing conveying surface 45a is defined by the peripheral edge 45, extending from the bottom wall 31 towards the absorbent mat 20 at an angle with respect to a vertical direction.

It should be noted that the conveying surface 45a may be curved or straight, provided that it is shaped so as to convey the urine from the bottom wall 31 towards the absorbent mat 20 according to the above mentioned features.

According to one embodiment, the bottom wall 31 has an annular rim 39 that surrounds and encloses the base element 10 to bring about a shape coupling between the frame 30 and the base element 10.

The side wall 35 of the frame 30 extends vertically from the bottom wall 31 thereby defining a lateral entrance 33 for a pet into the portion 21 of the absorbent mat 20 which is directly exposed from within the opening 32 of the bottom wall 31.

In the figures, the side wall 35 extends perpendicularly from the bottom wall 31.

According to a different embodiment, the side wall may extend from the bottom wall 31 at an angle greater than 90°.

According to a further different embodiment, the side wall may be a curved wall with a concavity faced towards the absorbent mat 20.

According to one embodiment, the base element 10 is a panel and the absorbent mat 20 is laid on such panel 10. In this embodiment, the base element 10 is a rectangular panel.

According to one embodiment, the absorbent mat 20 is a diaper. The absorbent material may include any type of liquid-absorbing material, such as absorbent polymers, foam materials, cellulose fibers and the like.

Advantageously, the base element 10 is made of a liquid-impervious material, such as a plastic material. Particularly, the base element may be formed of a material that is capable of withstanding the acid action of urine.

According to the embodiment as shown in the annexed figures, the base element 10 has four sides 10a, 10b, 10c, 10d. The bottom wall 31 of the frame 30 also has four sides 31a, 31b, 31c, 31d.

In this case, the lateral entrance 33 for a pet allows the pet to access to the portion 21 of the absorbent mat 20 from a side of the bottom wall 31.

In the embodiment of FIG. 1, the frame 30 has one wall 35 extending from the bottom wall 31. In this case, the entrance 33 is defined by the free sides 31b, 31c, 31d of the bottom wall 31.

Figure 5:
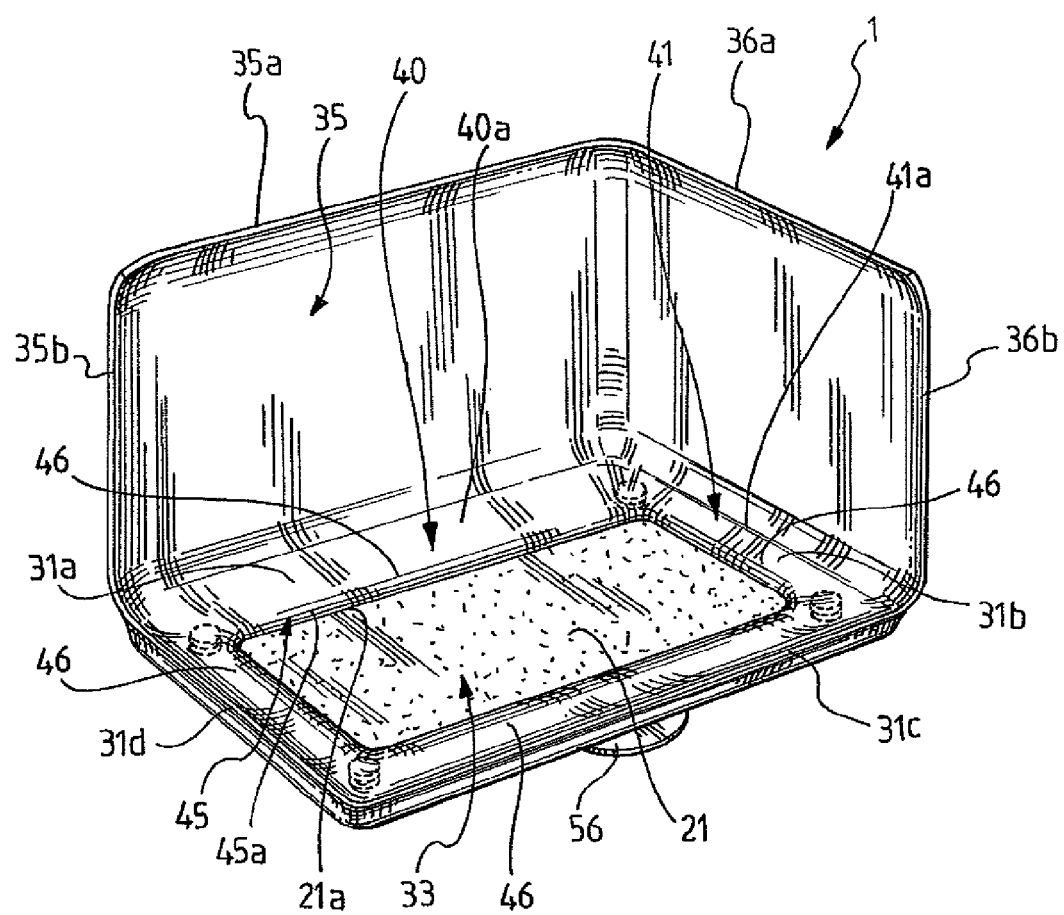
FIG. 5 is a perspective view of a second embodiment of a pet litter box of the present invention.
Figure 6:
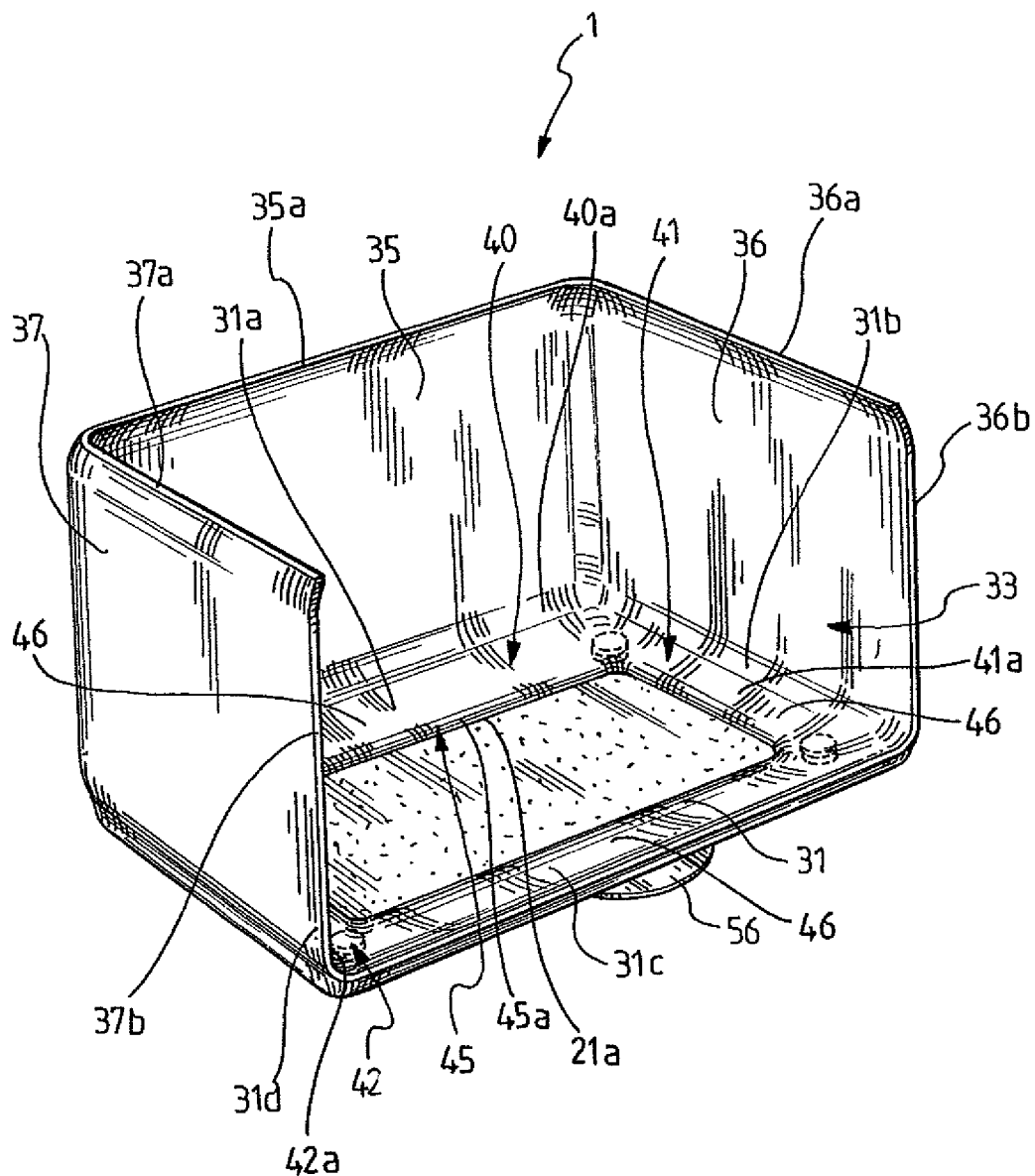
FIG. 6 is a perspective view of a third embodiment of a pet litter box of the present invention.

In the embodiments of FIGS. 5 and 6, the frame 30 has two side walls 35, 36 and three side walls 35, 36, 37 respectively. In this case, the entrance 33 is defined by the free sides 31c, 31d (FIG. 5) and the free side 31c (FIG. 6).

In both cases, the side walls extend vertically from the bottom wall 31 from adjacent sides of the bottom wall 31.

Particularly, in the embodiment of FIG. 5, the two side walls 35,36 extend vertically from two adjacent sides 31a,31b of the bottom wall 31. Alternatively, they might extend, for instance from the two adjacent sides 31d,31a.

In the embodiment of FIG. 6, the three side walls 35,36,37 extend vertically from three sides 31a, 31b, 31d of the bottom wall 31 that are adjacent in pairs.

The side walls may define various shapes, such as triangular, square, oval, hexagonal, pentagonal shapes, open at their sides to define a lateral entrance 33 for the pet into the portion 21 of the absorbent mat 20, that is directly exposed from within the opening 32 of the bottom wall 31.

Each side wall is connected to the bottom wall by a respective connection area.

According to embodiment of FIG. 6, the side walls 35,36, 37 are connected to the bottom wall 31 by respective connection areas 40,41,42.

Advantageously, the connection areas 40,41,42 have a concave shape, their concavity facing towards the bottom wall 31. This facilitates cleaning of the frame 30 by causing dirt to move downwards towards the absorbent mat 20 and urine to flow towards the absorbent mat 20 without stagnating on the bottom wall 31.

According to one embodiment, each connection area, in the example of figure 6 the connection areas 40,41,42, is shaped so as to convey the urine from the respective side wall 35,36,37 towards the bottom wall 31.

In particular, each connection area 40,41,42 is shaped so as to define a countersunk or tapered conveying surface 40a,41a, 42a, countersinking or tapering from the respective side wall 35,36,37 towards the bottom wall 31.

By this way, a continuously and gradually decreasing conveying surface is defined extending from the side walls 35,36, 37 towards the bottom wall 31.

Advantageously, the conveying surfaces 40a,41a,42a of the connection areas 40,41,42 are curved so as to make easier conveying the urine from the respective side walls 35,36,37 towards the bottom wall 31.

According to one embodiment, also the bottom wall 31 is shaped so as to convey the urine from the respective side connection areas 40, 41, 42 towards the peripheral edge 45 of the opening 32 thereby towards the absorbent mat 20.

In particular, the bottom wall 31 joins the respective side connection areas 40,41,42 with the peripheral edge 45 of the opening 32.

According to one embodiment, the bottom wall 31 is shaped so as to define a countersunk or tapered surface, countersinking or tapering from the connections areas 40,41,42 towards the peripheral edge 45 of the opening 32.

In particular, the thickness $d_2$ of the bottom wall 31, moving from the connection areas 40,41,42 towards the peripheral edge 45 of the opening 32, continuously and gradually decreases from the connection areas 40,41,42 towards the peripheral edge 45 of the opening 32.

By this way, a continuously and gradually decreasing conveying surface 46 is defined by the bottom wall 31, extending from the connection areas 40,41,42 towards the peripheral edge 45 of the opening 32 at an angle with respect to a vertical direction.

It should be noted that the conveying surface 46 may be curved or straight, provided that it is shaped so as to convey the urine from the respective side connection areas 40,41,42 towards the peripheral edge 45 of the opening 42 thereby towards the absorbent mat 20.

Due to the countersunk or tapered shape of the connection areas 40,41,42, of the bottom wall 31 and of the peripheral edge 45 of the opening 32, the pet litter box 1 allows dirt such as feces and/or urine to move downwards towards the absorbent mat 20 without stagnating on the side walls 35,36,37, the connection areas 40,41,42, the bottom wall 31 and the peripheral edge 45 of the opening 32. Moreover, it should be noted that the continuously decreasing conveying surface of the connection areas 40,41,42 of the bottom wall 31 and of the peripheral edge 45 of the opening 32 makes easier cleaning of the litter box 1.

According to one embodiment, the free edges of the bottom wall 31, represented in FIG. 1 by the sides 31b, 31c, 31d, in FIG. 5 by the sides 31c, 31d and in FIG. 6 by the side 31c, have a concave shape, and their concavity faces towards the absorbent mat 20 to facilitate urine flow towards the absorbent mat 20. This facilitates cleaning of the frame 30 by causing dirt to move downwards towards the bottom wall 31 and urine to flow towards the absorbent mat 20 without stagnating on the free edges of the bottom wall 31.

According to one embodiment, each free edge of the bottom wall 31, in the example of FIG. 6 the free edge 31c, is shaped so as to convey the urine towards the bottom wall 31.

In particular, each free edge is shaped so as to define a countersunk or tapered conveying surface, countersinking or tapering towards the bottom wall 31.

By this way, a continuously and gradually decreasing conveying surface is defined extending towards the bottom wall 31.

Advantageously, the free edges of the bottom wall 31 are curved so as to make easier conveying the urine towards the bottom wall 31.

According to one embodiment, also the free edges of the side walls 35,36,37 have a concave shape with a concavity facing towards the interior of the frame 30 for improved urine sprinkling retention and guide to the absorbent mat 20. For instance, these edges are the free edges 35c, 35a, 35b of FIG. 1, the free edges 35b, 35a, 36a, 36b of FIG. 5 and the free edges 37b, 37a, 35a, 36a, 36b of FIG. 6.

In particular, each free edge of the side walls 35,36,37 is shaped so as to define a countersunk or tapered conveying surface, countersinking or tapering towards the respective side wall 35,36,37.

By this way, a continuously and gradually decreasing conveying surface is defined extending towards respective side walls 35,36,37.

Also in this case, the conveying surface of the free edges of the side walls 35,36,37 may be curved or straight.

Advantageously, the free edges of the side walls 35,36,37 are curved so as to make easier conveying the urine towards the said side walls 35,36,37.

Advantageously, the frame 30 is made of a liquid-impervious material, such as a plastic material. Thus, the frame 30 can be washed by a user. Particularly, like the base element 10, the frame 30 may be also formed of a material that is capable of withstanding the acid action of urine. Alternatively, the frame 30 may be covered with a liquid-impervious material.

The frame 30 may be formed as one piece or the walls 35,36,37 may be designed to be removably connected to the bottom wall 31.

According to one embodiment, the litter box 1 has fastener means 50 for removably fastening together the frame 30 and the base element 10.

Advantageously, the fastener means 50 engage at least one portion of the absorbing mat 20, such as the portion 22. By this arrangement, the absorbing mat 20 is better held in position between the base element 10 and the bottom wall 31.

According to the embodiment of the figures, the fastener means 50 include magnetic fastener means 51, 52 and mechanical fastener means 53.

The magnetic fastener means 51,52 include first magnetic means 51 and second magnetic means 52 having opposite polarity, associated with the base element 10 and the bottom wall 31 of the frame 30 respectively.

Figure 4:
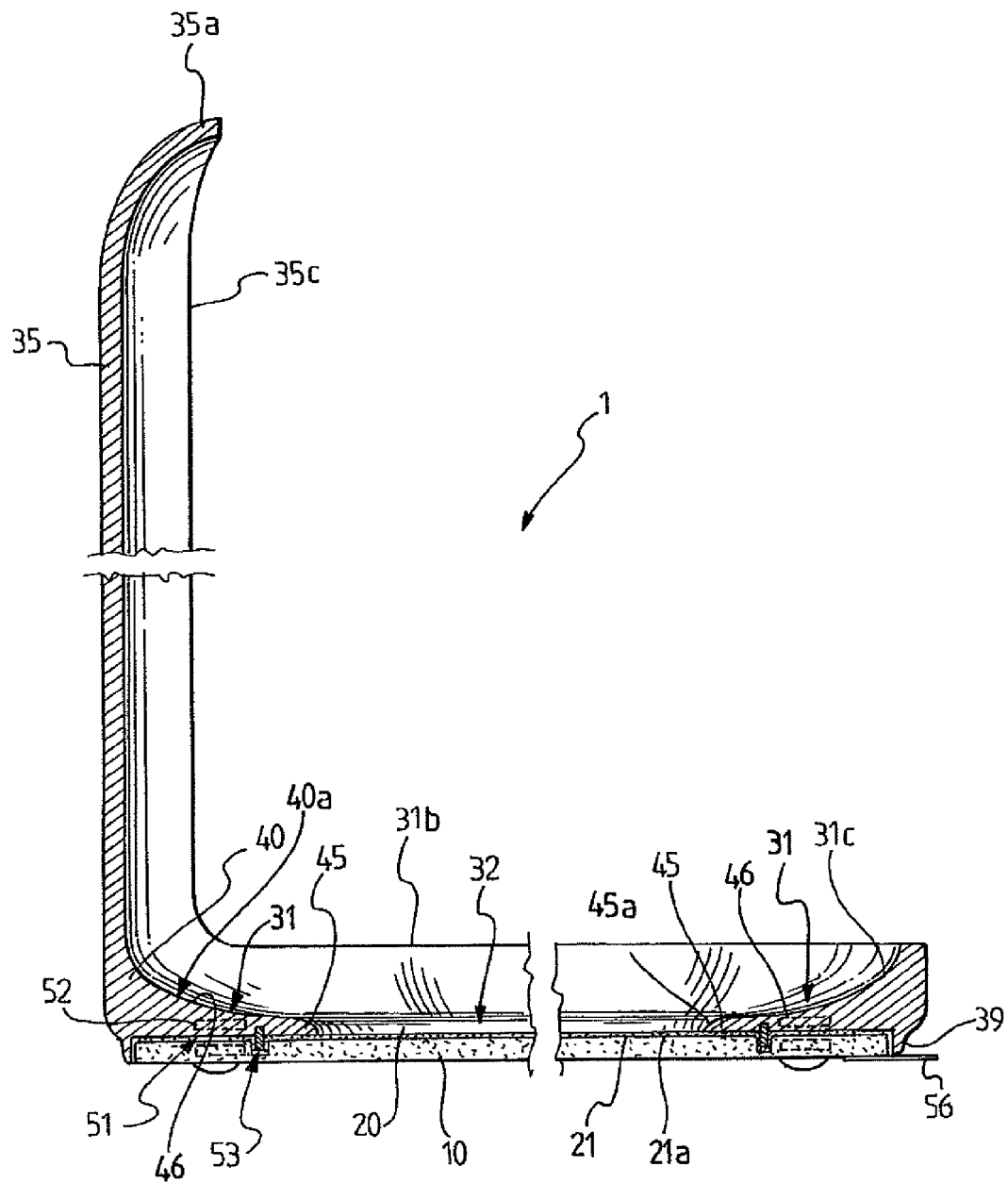
FIG. 4 is a sectional view of a detail of the litter box of FIG. 2, as taken along line IV-IV.

In the embodiment of FIG. 4, the magnetic fastener means 51,52 include a first magnet 51 located within the base element 10, particularly in the topside 12, and a second magnet 52 of opposite magnetic polarity to the first magnet 51, located in the bottom wall 31, particularly in the underside 38.

Particularly, the magnetic fastener means 51, 52 are located at the vertices of the four sides 31a-31d and 10a-10d which delimit the bottom wall 31 and the base element 10 respectively. Alternatively, respective magnetic elements may extend along a portion of the sides or along the whole perimeter of the bottom wall and the base element, for further improved holding of the absorbent mat 20.

According to one embodiment, the mechanical fastener means 53 include an annular protuberance 54 extending from the underside 38 of the bottom wall 31 and adapted to bring about a shape coupling with a facing annular groove 55 formed in the topside 12 of the support surface 11.

These mechanical fastener means 52 assist the user in locating the correct position of the frame 30 relative to the base element 10 and provide enhanced holding of the absorbent mat 20.

Advantageously, the base element 10 has a tab 56 extending from the base element 10, which is designed to be held by a user for easier disengagement of the frame 30 from the base element 10.

In order to prevent any liquid infiltration from the absorbent mat 20 through the opening 32, the litter box 1 may include sealing means 60 between the bottom wall 31 and the absorbent mat 20, particularly at the fastener means 50. For example, a rubber seal may be provided to ensure more effective tightness and prevent the pet's urine from leaking under the bottom wall 31 and coming out of one of the sides of such bottom wall 31.

In operation, the pet owner lays an absorbent mat 20 on the base element 10 and places the frame 30 thereupon. Advantageously, the mechanical fastener means 50 and the rim 39 assist the owner in locating the proper position of the frame 30 relative to the base element 10 and facilitate the form-fit between the bottom wall 31 of the frame 30 and the base element 10.

Once the pet has accomplished its physiological functions, the owner shall simply clean the frame 30 by guiding any residual urine/feces towards the absorbent mat 20, removing the frame 30, replacing the used absorbent mat 20 with a new one, for the litter box 1 to be ready for a new use.

It will be appreciated from the above that the pet litter box of the present invention obviates the above mentioned prior art drawbacks.

Those skilled in the art will obviously appreciate that a number of changes and variants may be made to the pet litter box of the invention as described hereinbefore to meet specific needs, without departure from the scope of the invention, as defined in the following claims.

The invention claimed is:
1. A pet litter box (1) comprising:
a base element (10) having a support surface (11) for a pet,
an absorbent mat (20) laid on the base element (10),
a bowl-shaped open-top frame (30) removably mounted on the base element (10),
wherein the frame (30) comprises:
a bottom wall (31) associated with the base element (10) having the absorbent mat (20) thereon, the bottom wall (31) having a central opening (32) positioned so as to entirely overlap at least one portion (21) of the absorbent mat (20), the opening (32) being delimited by an interior peripheral edge (45) joining the bottom wall (31) with the absorbent mat (20), at least one side wall (35) extending vertically from the bottom wall (31) to define an entrance (33) for a pet into the at least one portion (21) of the absorbent mat (20), the at least one portion (21) of the absorbent mat (20) is directly exposed from within the opening (32) and directly accessible by the pet, the entrance (33) is a lateral entrance configured to allow a pet to access to the at least one portion (21) of the absorbent mat (20) from a side of the bottom wall (31), the interior peripheral edge (45) has a thickness (dl) continuously and gradually decreasing thereby defining a curved conveying surface (45a) extending from the bottom wall (31) towards the absorbent mat (20) at an angle relative to a direction perpendicular to the base element (10), thereby conveying urine from the bottom wall (31) towards the absorbent mat (20), the at least one side wall (35, 36, 37) being connected to the bottom wall (31) via a respective connection area (40, 41, 42) having a concave shape with its incurved surface facing towards the opening (32) of the bottom wall (31), thereby a continuously and gradually decreasing conveying surface (40a, 41a, 42a) countersinking or tapering from the respective side wall (35, 36, 37) towards the bottom wall (31) and having a concave shape with the incurved surface opposed with respect to the convexed surface of the curved conveying surface (45a) for allowing urine to flow from the at least on side wall (35, 36, 37) to the absorbent mat (20).

2. A pet litter box (1) as claimed in claim 1, wherein the peripheral edge (45) is shaped so as to configure the opening (32) as a countersunk or tapered opening (32) countersinking or tapering from the bottom wall (31) towards the at least one portion (21) of the absorbent mat (20).

3. A pet litter box (1) as claimed in claim 1, wherein the conveying surface (40a, 41a, 42a) of the connection areas (40, 41, 42) is curved so as to make easier conveying the urine from the respective side walls (35, 36, 37) towards the bottom wall (31).

4. A pet litter box (1) as claimed in any one of claim 1, wherein the bottom wall (31) joins the respective connection area (40, 41, 42) with the peripheral edge (45) of the opening (32), the thickness ($d_2$) of the bottom wall (31) continuously and gradually decreasing from the respective connection area (40, 41, 42) towards the peripheral edge (45) of the opening (32) so as to convey the urine from the respective side connection area (40, 41, 42) towards the peripheral edge (45) of the opening (42) thereby towards the absorbent mat (20).

5. A pet litter box (1) as claimed in claim 4, wherein the bottom wall (31) is shaped so as to define a countersunk or tapered surface (46), countersinking or tapering from the respective connections area (40, 41, 42) towards the peripheral edge (45) of the opening (32).

6. A pet litter box (1) as claimed in claim 5, wherein the bottom wall (31) defines a continuously and gradually decreasing conveying surface (46), extending from the connection areas (40, 41, 42) towards the peripheral edge (45) of the opening (32) at an angle relative to a direction perpendicular to the base element (10).

7. A pet litter box (1) as claimed in claim 6, wherein the conveying surface (46) of the bottom wall (31) is curved so as to convey the urine from the respective side connection area (40, 41, 42) towards the peripheral edge (45) of the opening (42) thereby towards the absorbent mat (20).

8. A pet litter box (1) as claimed in claim 1, wherein the bottom wall (31) has at least one free edge, each free edge having a concave shape with its concavity facing towards the opening (32) of the bottom wall (31).

9. A pet litter box (1) as claimed in claim 8, wherein the at least one free edge being shaped so as to define a countersunk or tapered conveying surface, countersinking or tapering towards the bottom wall (31), thereby a continuously and gradually decreasing conveying surface being defined, which extends towards the bottom wall (31).

10. A pet litter box (1) as claimed in claim 1, wherein the at least one side wall (35) has at least one free edge, each free edge having a concave shape with its concavity facing towards the interior of the frame (30).

11. A pet litter box (1) as claimed in claim 10, wherein the at least one free edge being shaped so as to define a countersunk or tapered conveying surface, countersinking or tapering towards the bottom wall (31), thereby a continuously and gradually decreasing conveying surface being defined, which extends towards the at least one side wall (35).

12. A pet litter box (1) as claimed in claim 1, wherein the bottom wall (31) has four sides (31a, 31b, 31c, 31d), the at least one side wall of the frame (30) including a plurality of side walls (35, 36, 37).

13. A pet litter box (1) as claimed in claim 12, wherein the side walls of the plurality of side walls (35, 36, 37) extend vertically from the bottom wall (31) from adjacent sides (31a, 31b, 31c) thereof.

14. A pet litter box (1) as claimed in claim 1, comprising fastener means (50) for removably fastening together the base element (10) and the frame (30).

15. A pet litter box (1) as claimed in claim 14, wherein the fastener means (50) are adapted to engage at least one portion (22) of the absorbent mat (20).

16. A pet litter box (1) as claimed in claim 14, wherein the fastener means (50) include magnetic fastener means (51,52) having opposite polarity (51,52) associated with the base element (10) and the frame (30).

17. A pet litter box (1) as claimed in claim 14, wherein the fastener means (50) comprise mechanical fastener means (53) associated with the base element (10) and the bottom wall (31) of the frame (30) to bring about a shape coupling.

18. A pet litter box (1) as claimed in claim 17, wherein the mechanical fastener means (53) comprise an annular protuberance (54) extending downwards from the bottom wall (31) and adapted to bring about a shape coupling with a facing annular groove (55) formed in the top of the support surface (11) of the base element (10).

19. A pet litter box (1) as claimed in claim 1, wherein the base element (10) has a tab (56) extending from the base element (10) and designed to be held for easier disengagement of the frame (30) from the base element (10).

20. A pet litter box (1) as claimed in claim 1, comprising sealing means (60) interposed between the bottom wall (31) of the frame (30) and the absorbent mat (20).

21. A pet litter box (1) as claimed in claim 1, wherein at least one of the base element (10) and the frame (30) is made of a liquid-impervious material.

22. A pet litter box (1) as claimed in claim 1, wherein at least one of the base element (10) and the frame (30) is covered with a liquid-impervious material.

* * * * *